United States Patent
Miyazaki et al.

(10) Patent No.: US 11,118,647 B2
(45) Date of Patent: Sep. 14, 2021

(54) VIBRATION DAMPER

(71) Applicant: SUMITOMO RIKO COMPANY LIMITED, Komaki (JP)

(72) Inventors: Tomohiro Miyazaki, Komaki (JP); Yuki Yahata, Komaki (JP)

(73) Assignee: SUMITOMO RIKO COMPANY LIMITED, Komaki (JP)

(*) Notice: Subject to any disclaimer, the term of this patent is extended or adjusted under 35 U.S.C. 154(b) by 255 days.

(21) Appl. No.: 16/416,402

(22) Filed: May 20, 2019

(65) Prior Publication Data
US 2020/0096073 A1 Mar. 26, 2020

(30) Foreign Application Priority Data

Sep. 24, 2018 (JP) .............................. JP2018-178191

(51) Int. Cl.
F16F 7/108 (2006.01)
F16F 7/104 (2006.01)
F16F 15/02 (2006.01)
F16F 15/08 (2006.01)

(52) U.S. Cl.
CPC ............ *F16F 7/104* (2013.01); *F16F 15/022* (2013.01); *F16F 15/08* (2013.01); *F16F 2222/08* (2013.01)

(58) Field of Classification Search
CPC .. F16F 7/108; F16F 7/104; F16F 15/02; F16F 15/022; F16F 2222/08
USPC ...................................................... 188/379
See application file for complete search history.

(56) References Cited

U.S. PATENT DOCUMENTS

| 3,663,002 | A | * | 5/1972 | Gergle | .................... | F16F 7/108 |
| | | | | | | 267/141.1 |
| 4,815,556 | A | * | 3/1989 | Sumimoto | ............... | B60G 3/22 |
| | | | | | | 180/311 |
| 5,887,843 | A | * | 3/1999 | Hidekawa | ................ | B60G 7/00 |
| | | | | | | 248/559 |
| 2002/0144873 | A1 | * | 10/2002 | Kato | ....................... | F16F 7/108 |
| | | | | | | 188/378 |
| 2004/0149531 | A1 | * | 8/2004 | Durre | ..................... | B60G 13/16 |
| | | | | | | 188/379 |
| 2007/0215423 | A1 | * | 9/2007 | Staley | ...................... | F16F 7/116 |
| | | | | | | 188/379 |
| 2018/0201112 | A1 | * | 7/2018 | Takahashi | ............ | B60K 5/1216 |

(Continued)

FOREIGN PATENT DOCUMENTS

JP 2662108 B2 10/1997

*Primary Examiner* — Bradley T King
(74) *Attorney, Agent, or Firm* — Oliff PLC

(57) ABSTRACT

A vibration damper including a plate-shaped metal bracket having an attachment, and first and second extended parts extending from the attachment toward mutually opposite sides. Edge flanges rise from both widthwise edges of the attachment across its entire length. The first extended part includes the edge flanges extending continuously from the attachment and a pair of rising walls rising on both widthwise sides thereof. A first dynamic damper including a pair of support rubber elastic bodies and a mass member is provided between the rising walls. The second extended part includes a rising supporter rising from its end and the edge flanges being continuous with the attachment across its entire length including the rising supporter. A second dynamic damper including an inner shaft member and an outer mass member elastically connected by a main rubber elastic body is attached to the rising supporter.

6 Claims, 7 Drawing Sheets

(56) References Cited

U.S. PATENT DOCUMENTS

| | | | |
|---|---|---|---|
| 2019/0277364 A1* | 9/2019 | Lammi | B64C 11/008 |
| 2020/0172170 A1* | 6/2020 | Sakurai | F16F 7/104 |
| 2020/0278007 A1* | 9/2020 | Gustavsson | F16F 7/104 |
| 2021/0025469 A1* | 1/2021 | Mendoza | B64C 1/06 |

* cited by examiner

VIBRATION DAMPER

INCORPORATED BY REFERENCE

The disclosure of Japanese Patent Application No. 2018-178191 filed on Sep. 24, 2018 including the specification, drawings and abstract is incorporated herein by reference in its entirety.

BACKGROUND OF THE INVENTION

1. Field of the Invention

The present invention relates to a vibration damper for reducing vibration of a target member whose vibration is to be damped.

2. Description of the Related Art

Conventionally, as a vibration damper for reducing vibration of a target member whose vibration is to be damped such as a vehicle, for example, an automotive dynamic damper shown in Japanese Patent No. JP-B-2662108 has been known. The automotive dynamic damper has a structure in which a bracket attached to an on-board component (the target member) and a mass member are elastically connected by an elastic body.

Meanwhile, in the automotive dynamic damper described in JP-B-2662108, the resonance frequency of the mass-spring system composed of the mass member and the elastic body is tuned to match the frequency of the vibration to be damped which can be a problem in the target member, so that an excellent vibration damping action on the target vibration to be damped will be exhibited.

However, with the dynamic damper as in JP-B-2662108, there are cases where it is difficult to obtain the desired vibration damping effect because a degree of freedom in tuning the resonance frequency of the mass-spring system is not sufficient. That is, when higher vibration damping performance is required for the target vibration to be damped at a specific frequency, if a larger mass member is to be adopted, there is a problem of an installation space due to increase in size of the mass member. Meanwhile, when obtaining excellent vibration damping effects for two types of vibrations having different frequencies, it is necessary to separately attach two automotive dynamic dampers tuned to the respective vibration frequencies to the target member, thereby posing a risk of complicating the attaching.

SUMMARY OF THE INVENTION

It is therefore one object of this invention to provide a vibration damper of novel structure which is able to obtain a large degree of freedom in tuning vibration damping characteristics, as well as to be easily attached to a target member whose vibration is to be damped.

Hereinafter, the preferred embodiments of the present invention achieved on the basis of such findings obtained by the inventors will be described. The following preferred embodiments and/or elements employed in each preferred embodiment of the invention may be adopted at any possible optional combinations.

Specifically, a first preferred embodiment of the present invention provides a vibration damper for reducing vibration of a target member whose vibration is to be damped, comprising: a metal bracket including an attachment and being configured to be attached to the target member at the attachment, the metal bracket having a plate shape that extends from the attachment toward mutually opposite sides, the attachment being provided with edge flanges that rise from both widthwise edges across an entire length thereof; a first extended part serving as one extended side of the metal bracket, the first extended part being provided with the edge flanges that extend continuously from the attachment on both widthwise edges thereof and a pair of rising walls that rise on both widthwise sides thereof; a first dynamic damper provided between the rising walls, the first dynamic damper including a pair of support rubber elastic bodies fixed to the rising walls and a mass member elastically supported by the support rubber elastic bodies; a second extended part serving as another extended side of the metal bracket, the second extended part being provided with a rising supporter that rises in an L shape from an end thereof and the edge flanges that are continuous with the attachment on both widthwise edges thereof and extend across an entire length thereof including the rising supporter; and a second dynamic damper attached to the rising supporter, the second dynamic damper including an inner shaft member and a tubular outer mass member that are elastically connected by a main rubber elastic body.

According to the vibration damper structured following the first preferred embodiment, the first dynamic damper and the second dynamic damper are provided. Thus, for example, by roughly matching the tuning frequencies of the first dynamic damper and the second dynamic damper, it is possible to obtain a better vibration damping effect for vibrations of a specific frequency. Besides, by making the tuning frequencies of the first dynamic damper and the second dynamic damper different from each other, it is also possible to obtain vibration damping effects for two types of vibrations having different frequencies.

Moreover, the first dynamic damper and the second dynamic damper are attached to a common metal bracket, and the metal bracket is attached to the target member at the attachment, so that the first dynamic damper and the second dynamic damper can be simultaneously attached to the target member. Therefore, the two dynamic dampers can be easily attached to the target member.

Furthermore, the first dynamic damper and the second dynamic damper are attached on the opposite sides to each other with respect to the metal bracket. Thus, the load exerted on the metal bracket by displacement of the mass member and the outer mass member at the time of vibration input is dispersed to both sides. Therefore, the maximum value of the force acting on the metal bracket is suppressed, thereby easily obtaining a sufficient strength of the metal bracket.

Additionally, in the metal bracket, the attachment configured to be attached to the target member includes the edge flanges rising from both widthwise edges, and the edge flanges are provided continuously so as to extend to the first extended part and the second extended part. With this configuration, the metal bracket is reinforced by the edge flanges, and the rigidity of the metal bracket is sufficiently obtained. Moreover, the first extended part supporting the first dynamic damper includes the pair of rising walls, while the second extended part supporting the second dynamic damper includes the rising supporter, so that the rigidity is advantageously obtained particularly in the first extended part and the second extended part. In addition, the second extended part is provided with the edge flanges continuously across the entire length thereof including the rising supporter. This makes it possible to set a particularly high rigidity to the second extended part. By sufficiently ensuring the rigidity of the metal bracket in this manner, it is possible to set the natural frequency of the metal bracket to a sufficiently higher frequency than the frequency of the target vibration to be damped. Thus, at the time of input of the target vibration, it is possible to prevent an adverse effect on the vibration state due to the resonance of the metal bracket.

Besides, the first dynamic damper has a structure in which the mass member is elastically supported by the pair of support rubber elastic bodies between the rising walls, while the second dynamic damper has a bushing structure in which the inner shaft member and the tubular outer mass member are elastically connected by the main rubber elastic body, so that the first dynamic damper and the second dynamic damper are different in structure from each other. This makes it possible for the first dynamic damper and the second dynamic damper to easily cope with different required characteristics, installation space, and the like.

A second preferred embodiment of the present invention provides the vibration damper according to the first preferred embodiment, wherein a resonance frequency of the second dynamic damper is tuned to a higher frequency than a resonance frequency of the first dynamic damper.

According to the second preferred embodiment, in the metal bracket, the second extended part, to which the second dynamic damper is attached, includes the rising supporter that rises at its end and includes the edge flanges across its entirety including the rising supporter, so that it is easy to set high deformation rigidity. Therefore, even if the second dynamic damper is tuned to a higher frequency, resonance of the metal bracket is less likely to occur at the time of input of the target vibration of the second dynamic damper.

A third preferred embodiment of the present invention provides the vibration damper according to the first or second preferred embodiment, wherein in the metal bracket, a direction of rising of the rising supporter and a direction of rising of the rising walls are opposite to each other.

According to the third preferred embodiment, for example, when at least one of the first dynamic damper and the second dynamic damper is attached later to the metal bracket, the attaching can be easily performed.

A fourth preferred embodiment of the present invention provides the vibration damper according to any one of the first to third preferred embodiments, wherein the first dynamic damper has a symmetrical shape with respect to a widthwise center thereof, while the second dynamic damper has a symmetrical shape with respect to a widthwise center thereof, and the widthwise center of the first dynamic damper and the widthwise center of the second dynamic damper are coincident with each other.

According to the fourth preferred embodiment, the first dynamic damper and the second dynamic damper, each of which has a symmetrical shape with respect to the widthwise center thereof, are disposed at roughly coincident positions in the width direction. With this arrangement, at times of vibration input, an input such as torsion is less likely to act on the metal bracket, thereby substantially improving the rigidity of the metal bracket.

A fifth preferred embodiment of the present invention provides the vibration damper according to any one of the first to fourth preferred embodiments, wherein the support rubber elastic bodies of the first dynamic damper are bonded by vulcanization to the respective rising walls, while the inner shaft member of the second dynamic damper is fastened by bolting to the rising supporter.

According to the fifth preferred embodiment, by the support rubber elastic bodies being bonded by vulcanization to the respective rising walls, it is possible to form the first dynamic damper in the mounted state onto the metal bracket without needing a special mounting operation. Meanwhile, the second dynamic damper is mounted later onto the metal bracket by the inner shaft member being fastened by bolting to the rising supporter. Thus, for example, by preparing various types of second dynamic dampers having different tuning frequencies, and selecting and mounting an appropriate second dynamic damper according to the target vibration, it is also possible to obtain various types of vibration dampers having different characteristics while using the metal bracket and the first dynamic damper in common. Besides, since the second dynamic damper is easily replaceable, it is also possible to appropriately replace the second dynamic damper, for example, according to changes in the characteristics or the vibration state, and the like.

A sixth preferred embodiment of the present invention provides the vibration damper according to any one of the first to fifth preferred embodiments, wherein in the metal bracket, the first extended part is provided with a wide part having a width dimension larger than that of the second extended part, and the rising walls rise on both widthwise sides of the wide part.

According to the sixth preferred embodiment, it is possible to obtain a large distance between the opposed rising walls in the first extended part, so as to obtain a large degree of freedom in tuning the first dynamic damper. On the other hand, by making the width dimension of the second extended part relatively small, the vibration damper can be downsized.

According to the present invention, the first dynamic damper and the second dynamic damper are able to obtain a better vibration damping effect for one type of target vibration to be damped, or to obtain respective excellent vibration damping effects for two types of target vibrations to be damped having different frequencies. Besides, by attaching the metal bracket to the target member, the first dynamic damper and the second dynamic damper can be simultaneously attached to the target member.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

Figure 1:
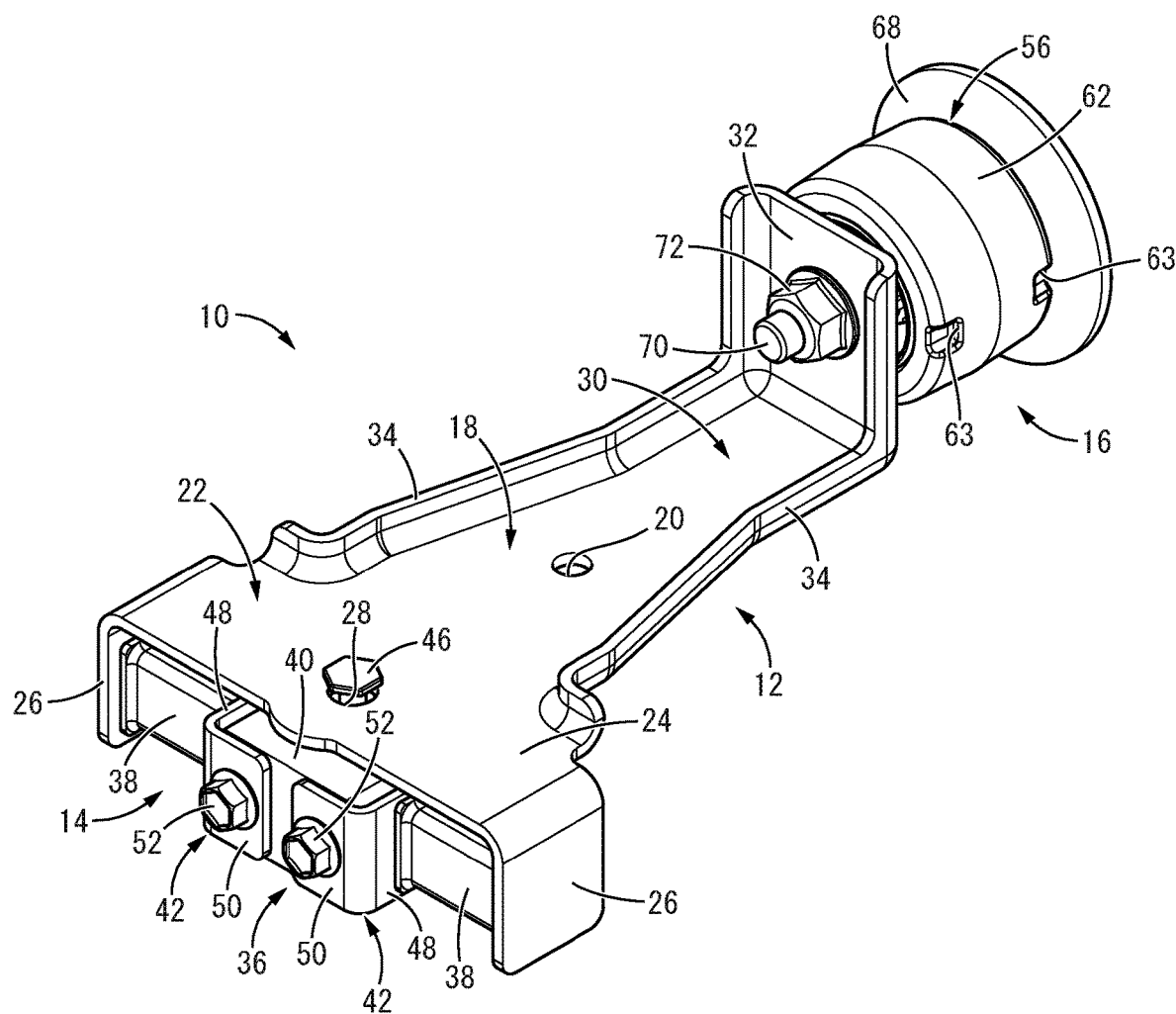
FIG. 1 is a perspective view showing a vibration damper according to a first practical embodiment of the present invention.
Figure 2:
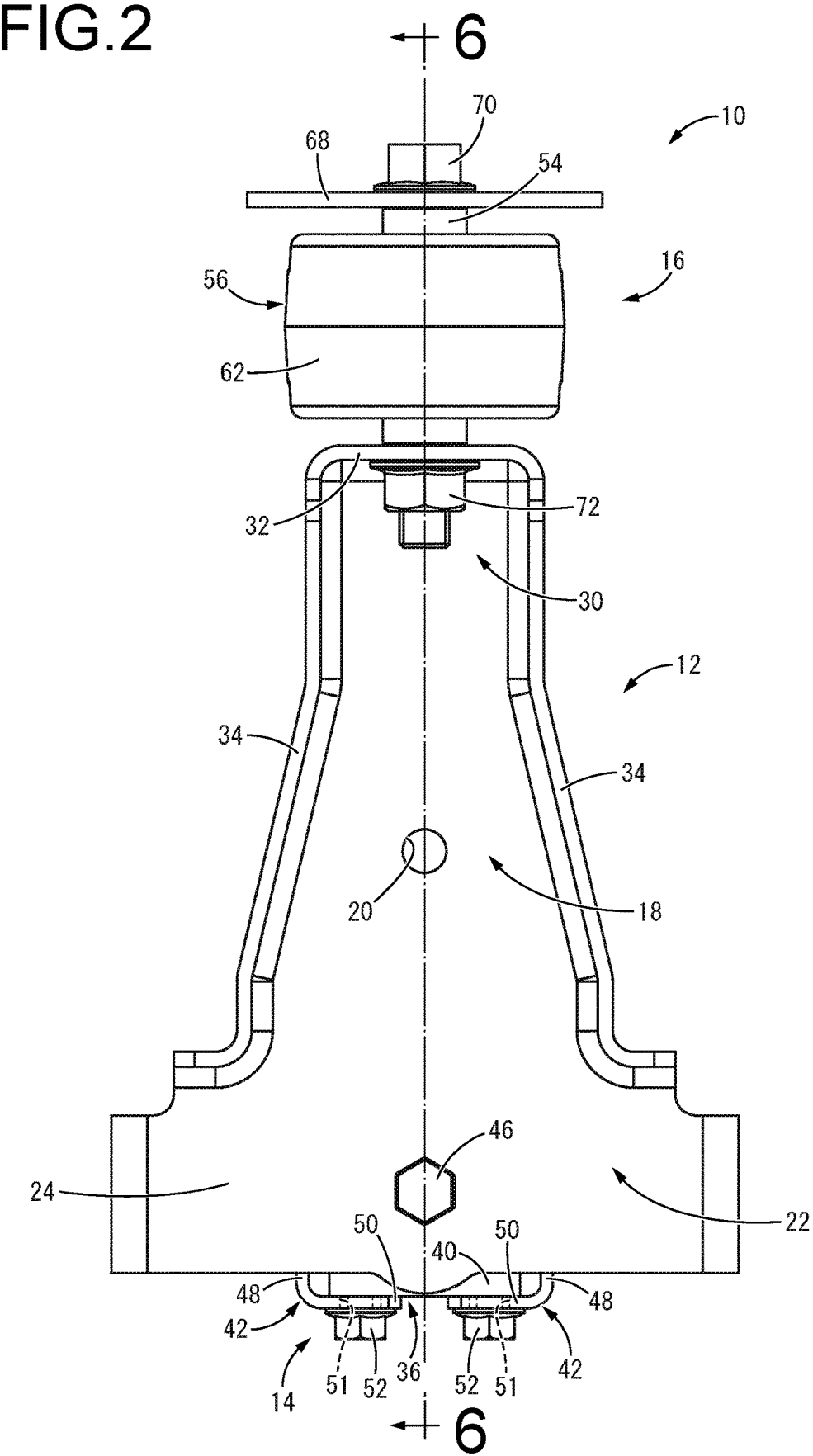
FIG. 2 is a top plan view of the vibration damper shown in FIG. 1.

A practical embodiment of the present invention will be described below in reference to the drawings.

FIGS. 1 to 6 show a vibration damper 10 according to a first practical embodiment of the present invention. The vibration damper 10 is configured to be attached to a vehicle body 74 to be described later to reduce vibration of the vehicle body 74, and has a structure including a metal bracket 12 configured to be attached to the vehicle body 74, and a first dynamic damper 14 and a second dynamic damper 16 attached to both ends of the metal bracket 12. In the following description, as a general rule, the vertical direction refers to the vertical direction in FIG. 4.

Described more specifically, the metal bracket 12 is a high rigidity component made of metal or the like, and has an elongated plate shape that extends from an attachment 18 provided in the middle portion thereof toward mutually opposite sides. The attachment 18 is configured such that the width dimension is gradually reduced from one side to the other in the lengthwise direction (the vertical direction in FIG. 2), and includes a bolt hole 20 penetrating the central portion thereof.

Furthermore, the metal bracket 12 includes a first extended part 22 extending to one side in the lengthwise direction with respect to the attachment 18. The first extended part 22 is provided with a wide part 24 whose width dimension is larger than that of the attachment 18 at the distal end portion opposite to the attachment 18, and a pair of rising walls 26, 26 are integrally formed on both widthwise sides of the wide part 24. The rising walls 26, 26 have a plate shape that rises and protrudes in the thickness direction (the left-right direction in FIG. 5) of the metal bracket 12 on both widthwise sides of the first extended part 22, and are opposed to each other in the width direction (the left-right direction in FIG. 3) of the metal bracket 12. By the rising walls 26 being provided, the rigidity of the metal bracket 12 is enhanced in the first extended part 22. In addition, the wide part 24 of the first extended part 22 includes an insertion hole 28 penetrating the central portion thereof in the thickness direction. Besides, the width dimension of the wide part 24, which is the distal end portion of the first extended part 22, is made larger than that of a second extended part 30 described later.

Moreover, the metal bracket 12 includes a second extended part 30 extending to the other side in the lengthwise direction with respect to the attachment 18. The second extended part 30 extends with a constant width dimension which is approximately the same as that of the end of the attachment 18 on the other side in the lengthwise direction, and is provided with a rising supporter 32 that rises in an L shape from the end edge thereof in the lengthwise direction. The rising supporter 32 of the present practical embodiment protrudes toward the opposite side in the thickness direction of the metal bracket 12 with respect to the rising walls 26, 26. That is, in the present practical embodiment, the direction of rising of the rising walls 26 is the downward direction, and the direction of rising of the rising supporter 32 is the upward direction.

Besides, the metal bracket 12 is provided with edge flanges 34 respectively at both widthwise edges thereof. The edge flanges 34 rise upward from the both widthwise edges, and are provided across the entire length of the attachment 18. Furthermore, the edge flanges 34 extend continuously from the attachment 18 to the first extended part 22 and the second extended part 30 at the both widthwise edges, and are continuously provided from the proximal end portion of the first extended part 22 (the inside portion connected to the attachment 18, which is the portion from the end on the attachment 18 side to the inside edge of the wide part 24) to the roughly entire second extended part 30 including the rising supporter 32. Moreover, in the portion excluding the rising supporter 32, the edge flanges 34 protrude to the same side as the rising supporter 32 in the thickness direction of the metal bracket 12 (the upper side), and in the rising supporter 32, the edge flanges 34 protrude inward in the lengthwise direction of the metal bracket 12 (the lower side in FIG. 2). By providing such edge flanges 34, the deformation rigidity of the metal bracket 12 may be improved. In particular, the edge flange 34 extends to a position close to the rising wall 26 on one extended side, while continuously extending across the entire length on the other extended side including the rising supporter 32. Thus, the entire metal bracket 12 is reinforced by the rising walls 26, 26, the rising supporter 32, and the edge flanges 34, 34. The protruding height of the edge flanges 34 is smaller than the protruding height of the rising supporter 32.

The metal bracket 12 of the present practical embodiment is a press-mold metal, and the rising walls 26, 26, the rising supporter 32, and the edge flanges 34, 34 are all integrally formed with the attachment 18, the first extended part 22, and the second extended part 30 by the bending process using a press. Additionally, the proximal end portions of the rising walls 26, 26, the rising supporter 32, and the edge flanges 34, 34 are formed into a curved shape by bending process.

In addition, the first dynamic damper 14 is attached to the first extended part 22 of the metal bracket 12. The first dynamic damper 14 includes a mass member 36 and a pair of support rubber elastic bodies 38, 38 that elastically connect the mass member 36 to the pair of rising walls 26, 26.

The mass member 36 includes a mass main body 40 and a pair of mass brackets 42, 42. The mass main body 40 is formed of a material having a large mass density, such as iron, and in the present practical embodiment, the mass main body 40 has a solid rectangular block shape. Besides, the mass main body 40 includes a screw hole 44 opening onto its upper face. A stopper bolt 46 is screwed into the screw hole 44, so that the head side of the stopper bolt 46 protrudes upward from the mass member 36.

Figure 3:
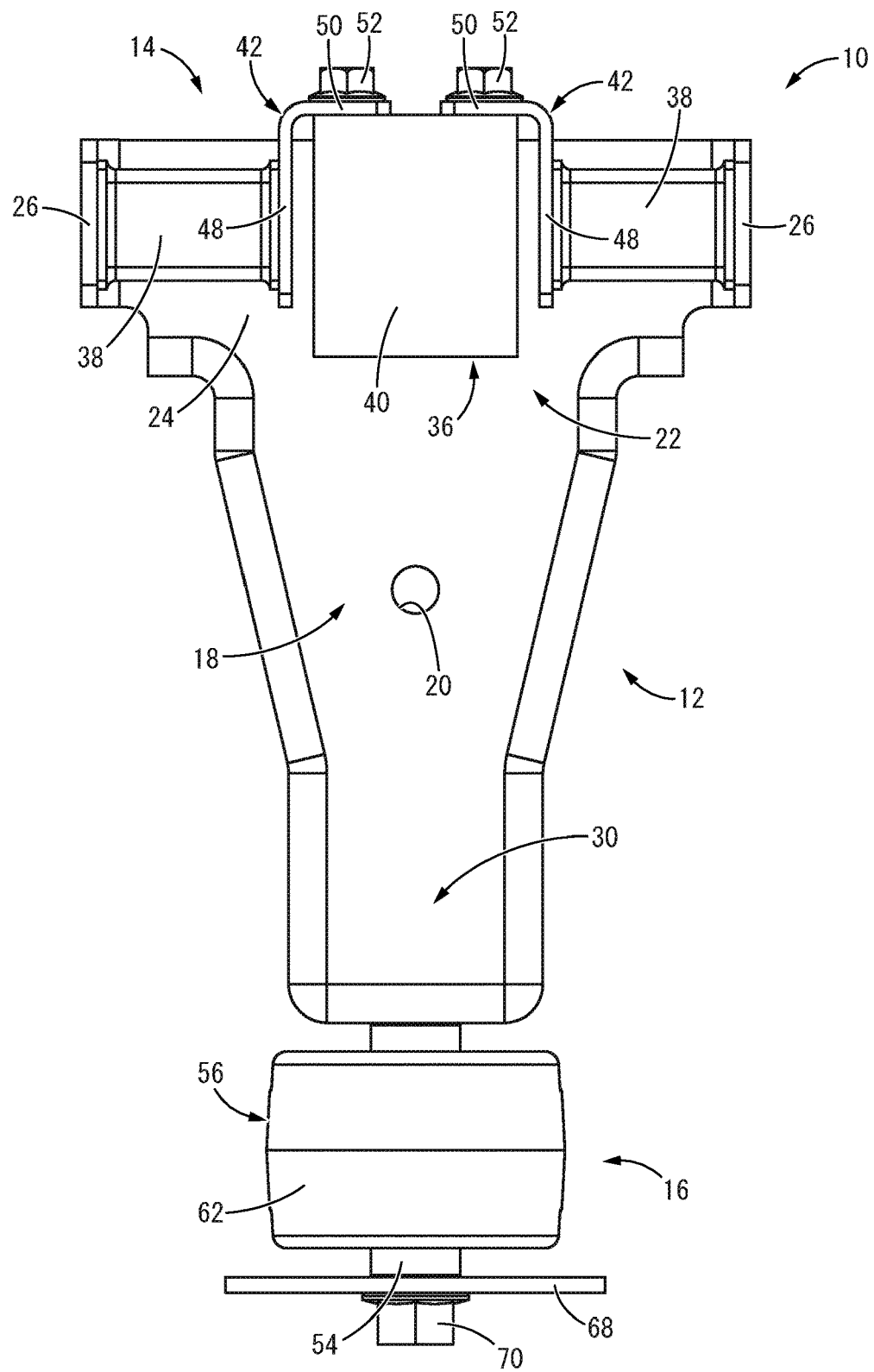
FIG. 3 is a bottom plan view of the vibration damper shown in FIG. 1.
Figure 4:
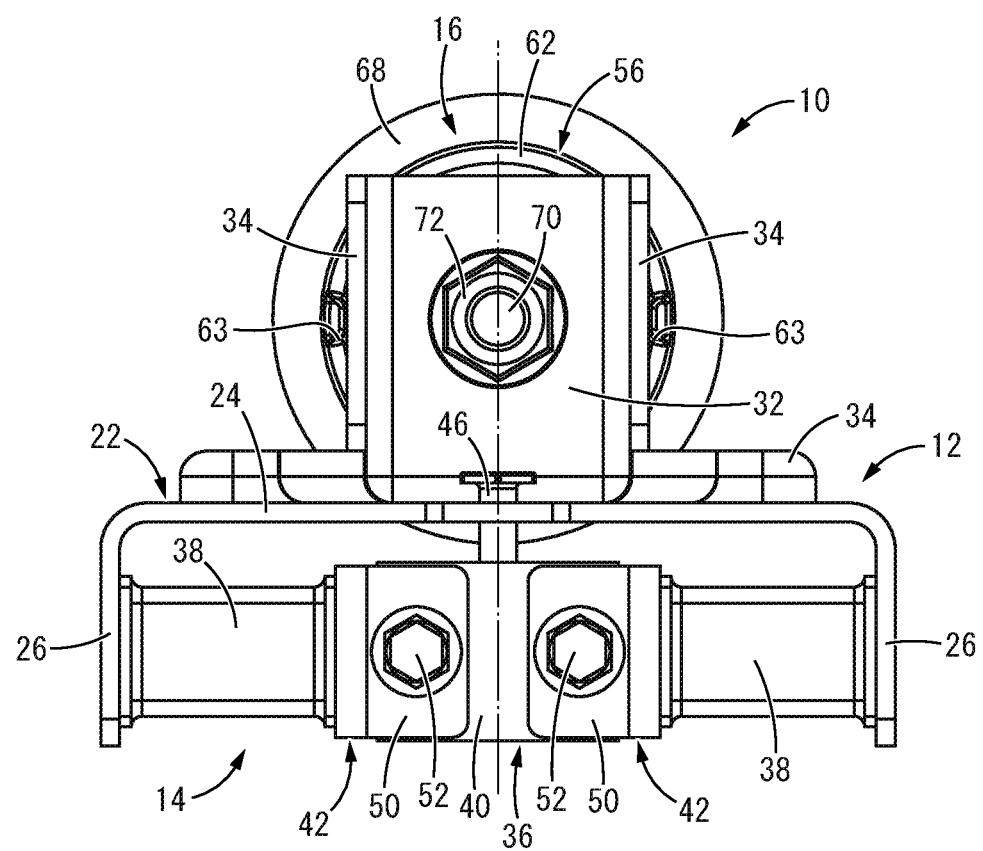
FIG. 4 is a front view of the vibration damper shown in FIG. 1.
Figure 5:
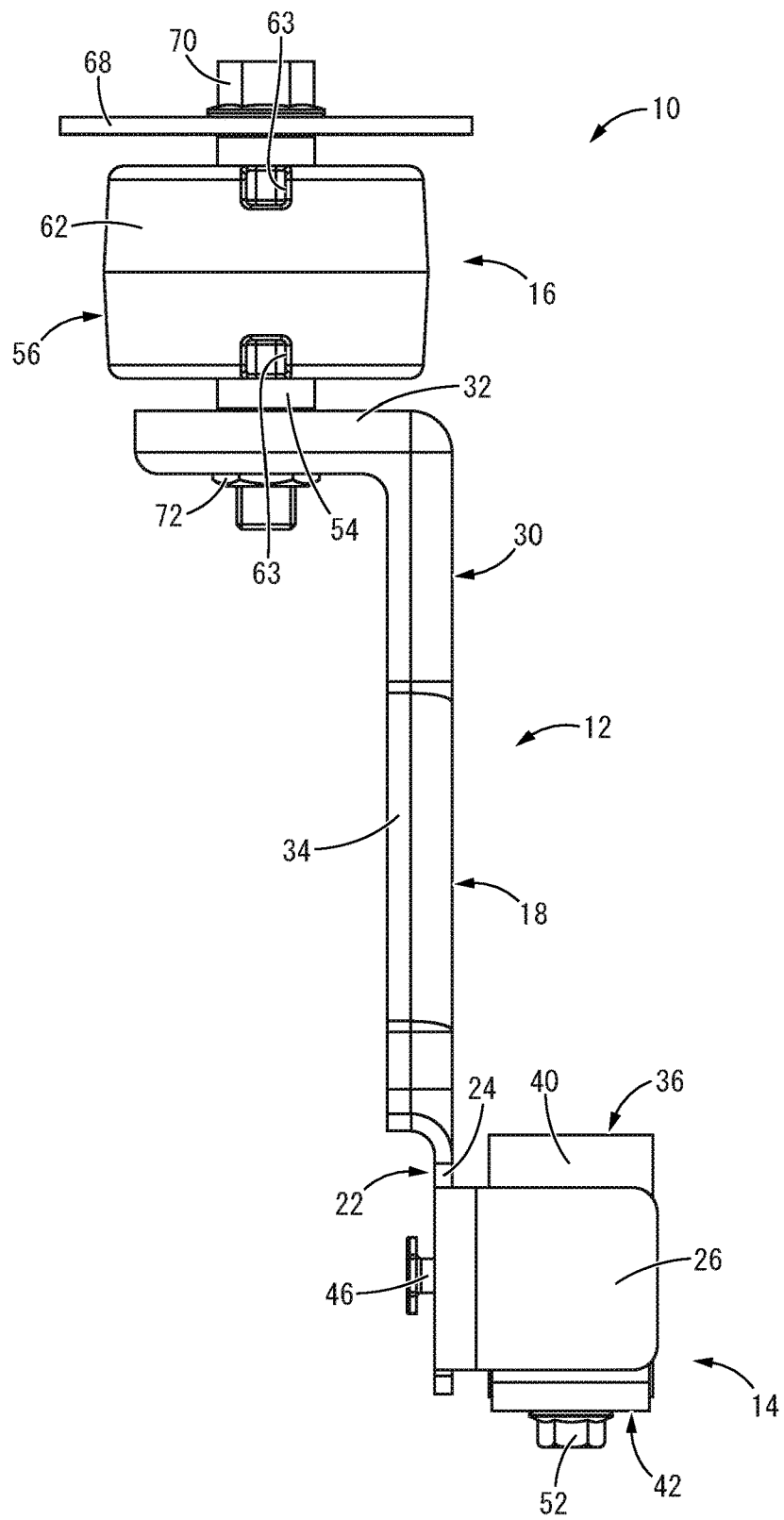
FIG. 5 is a right side view of the vibration damper shown in FIG. 1.

Additionally, the mass brackets 42, 42 are mounted onto the mass main body 40. The mass bracket 42 is a high rigidity component formed of metal or the like, and as shown in FIG. 3, has a plate shape that bends in an L shape as viewed in the vertical direction. More specifically, the mass bracket 42 integrally includes a fixing piece 48 disposed in opposition to the widthwise outer side of the mass main body 40, and a mounting piece 50 protruding from one lengthwise end of the fixing piece 48 and overlapped on the lengthwise end face of the mass main body 40 in a state of contact. Moreover, the mounting piece 50 of the mass bracket 42 is penetrated by a bolt hole 51 having an elliptical cross section with the width direction as the major axis.

A fastening bolt 52 is inserted into the bolt hole 51 of the mass bracket 42, and then screwed into a screw hole (not shown) of the mass main body 40, so that the mass bracket 42 is fastened to the mass main body 40. The mass brackets 42, 42 are symmetrical in shape with respect to a plane extending in the widthwise center of the mass main body 40, and are respectively attached to both widthwise sides of the mass main body 40. By so doing, the mounting pieces 50, 50 of the mass brackets 42, 42 are disposed on the both widthwise sides of the mass main body 40.

Besides, the support rubber elastic bodies 38 are respectively fixed to the mass brackets 42, 42 of the mass member 36. The support rubber elastic body 38 has a pillar shape extending roughly in the width direction, and in the present practical embodiment, the support rubber elastic body 38 extends with a quadrangular cross section having rounded corners. With the support rubber elastic bodies 38, 38, one end is fixed to each one of the fixing pieces 48, 48 of the mass brackets 42, 42, while the other end is fixed to each one of the rising walls 26, 26. By so doing, the mass member 36 including the mass brackets 42, 42 and the rising walls 26, 26 of the metal bracket 12 are elastically connected to each other by the support rubber elastic bodies 38, 38. In the present practical embodiment, the first dynamic damper 14 configured as described above has a roughly symmetrical shape with respect to the widthwise center thereof (the plane indicated by the dot-and-dash line in FIGS. 2 and 4).

In the present practical embodiment, the support rubber elastic bodies 38, 38 are bonded by vulcanization to the rising walls 26, 26 of the metal bracket 12 and the mass brackets 42, 42 at the time of molding. With the support rubber elastic body 38, the cross-sectional area is made large at both widthwise ends thereof, and a large fixing area to the mass brackets 42, 42 and the rising walls 26, 26 is obtained. Additionally, since the bolt hole 51 is an elongated hole, even if the support rubber elastic body 38 is contracted by cooling after being molded between the rising wall 26 and the mass bracket 42, the mass bracket 42 and the mass main body 40 can be connected by the fastening bolt 52 without applying tensile stress to the support rubber elastic body 38.

Furthermore, the mass member 36 is disposed below and remote from the wide part 24 of the metal bracket 12 in a state of being elastically connected to the metal bracket 12 by the support rubber elastic bodies 38, 38. Then, the stopper bolt 46 is inserted into the insertion hole 28 of the wide part 24 and screwed into the screw hole 44 of the mass main body 40. Accordingly, the amount of downward displacement of the mass main body 40 relative to the wide part 24 is limited by contact between the head part of the stopper bolt 46 and the opening peripheral edge of the insertion hole 28. By so doing, even if the support rubber elastic body 38 is broken by any possibility, the stopper bolt 46 is caught by the opening peripheral edge of the insertion hole 28, thereby preventing the mass main body 40 from falling off. There is a gap between the outer circumferential surface of the stopper bolt 46 and the inner circumferential surface of the insertion hole 28, and owing to that gap, the mass member 36 is allowed to undergo relative displacement with respect to the metal bracket 12 not only in the downward direction, but also in the lengthwise direction and the width direction.

Figure 7:
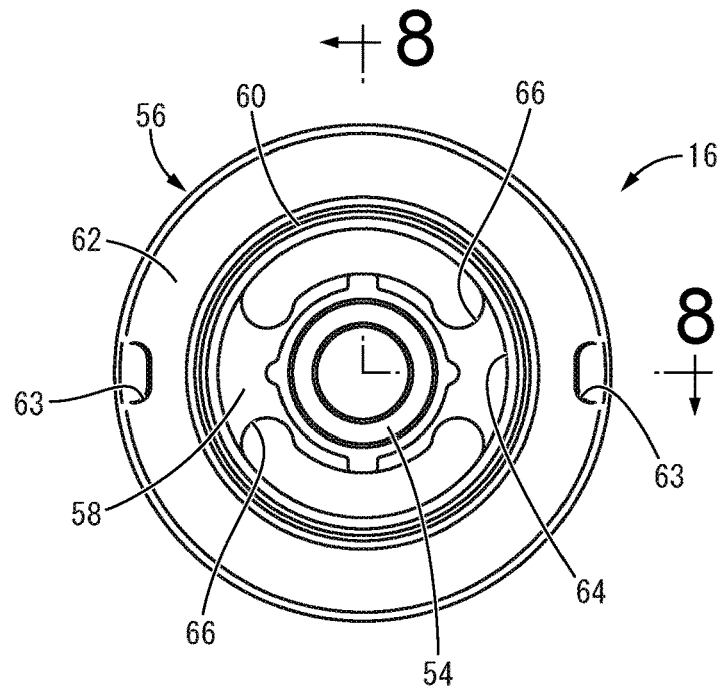
FIG. 7 is an enlarged front view of a second dynamic damper of the vibration damper shown in FIG. 1.
Figure 8:
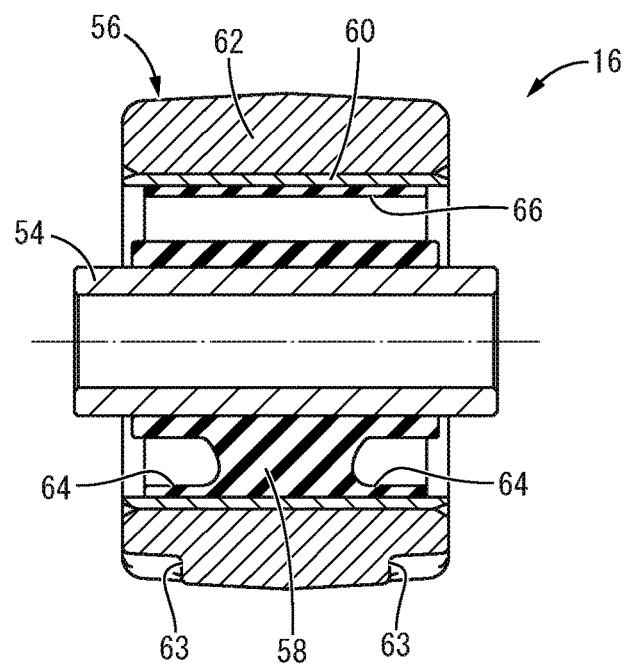
FIG. 8 is a cross sectional view taken along line 8-8 of FIG. 7.

On the other hand, the second dynamic damper 16 is attached to the rising supporter 32 of the second extended part 30. As shown in FIGS. 7 and 8, the second dynamic damper 16 includes an inner shaft member 54 and an outer mass member 56 that are elastically connected by a main rubber elastic body 58.

The inner shaft member 54 has a small-diameter, generally round tubular shape, and extends straightly with a roughly constant cross-sectional shape. The outer mass member 56 includes a thin-walled, tubular intermediate sleeve 60 and a thick-walled, tubular mass main body 62 externally fastened to the intermediate sleeve 60. The outer mass member 56 is larger in diameter than the inner shaft member 54 and extends straightly in the same direction as the inner shaft member 54, while having a smaller length dimension in the axial direction than the inner shaft member 54. The mass main body 62 includes concave parts 63, 63 that are provided at two locations in the circumferential direction and open onto the outer circumferential surface at both axial ends. The positions of the concave parts 63 make it possible to specify the circumferential orientation of the second dynamic damper 16.

The inner shaft member 54 and the outer mass member 56 are coaxially arranged, and the main rubber elastic body 58 is disposed radially between the inner shaft member 54 and the outer mass member 56. The main rubber elastic body 58 has a thick-walled, generally round tubular shape overall, with its inner circumferential surface bonded by vulcanization to the outer circumferential surface of the inner shaft member 54, while its outer circumferential surface being bonded by vulcanization to the inner circumferential surface of the intermediate sleeve 60 constituting the outer mass member 56. Besides, the main rubber elastic body 58 includes concave grooves 64 extending in the circumferential direction on both end surfaces in the axial direction, and a pair of through holes 66, 66 penetrating therethrough in the axial direction on both sides in one diametrical direction. In the present practical embodiment, the main rubber elastic body 58 is molded as an integrally vulcanization molded component including the inner shaft member 54 and the intermediate sleeve 60. By the intermediate sleeve 60 of the integrally vulcanization molded component being press-fitted into the radial inside of the mass main body 62, the mass main body 62 is fastened to the intermediate sleeve 60 so as to constitute the outer mass member 56.

By so doing, the inner shaft member 54 and the outer mass member 56 constituted by the intermediate sleeve 60 and the mass main body 62 are elastically connected to each other by the main rubber elastic body 58, so as to provide the second dynamic damper 16. The second dynamic damper 16 of the present practical embodiment has a roughly symmetrical shape with respect to the widthwise center (the plane indicated by the dot-and-dash line in FIGS. 2 and 4), and has an approximate shape of 180-degree rotational symmetry with respect to the center axis of the inner shaft member 54.

In addition, the second dynamic damper 16 is disposed on the other side in the lengthwise direction with respect to the metal bracket 12, and the inner shaft member 54 is fastened to the rising supporter 32 of the metal bracket 12. More specifically, one axial end face of the inner shaft member 54 is abutted at the rising supporter 32, and a displacement limiting member 68 is overlapped with the other axial end face of the inner shaft member 54. Then, the inner shaft member 54, the rising supporter 32, and the displacement limiting member 68 are connected in the lengthwise direction by a connecting bolt 70 and a nut 72. By so doing, in the second dynamic damper 16, the inner shaft member 54 is fastened by bolting to the rising supporter 32 of the metal bracket 12, so as to be attached to the metal bracket 12.

The displacement limiting member 68 has a generally circular disk shape, and its outside diameter dimension is larger than that of the outer mass member 56. It is configured such that even if the main rubber elastic body 58 is broken or the mass main body 62 slips out of the intermediate sleeve 60 by any possibility, the movement of the mass main body 62 in the axial direction will be limited by abutment against the displacement limiting member 68 or the rising supporter 32, thereby preventing the mass main body 62 from falling off in the axial direction.

Besides, the first dynamic damper 14 and the second dynamic damper 16 attached to the metal bracket 12 are arranged such that the widthwise center of the first dynamic damper 14 and the widthwise center of the second dynamic damper 16 are coincident with each other. That is, the widthwise center of the first dynamic damper 14 and the widthwise center of the second dynamic damper 16 are both located on the plane indicated by the dot-and-dash line in FIGS. 2 and 4.

Figure 6:
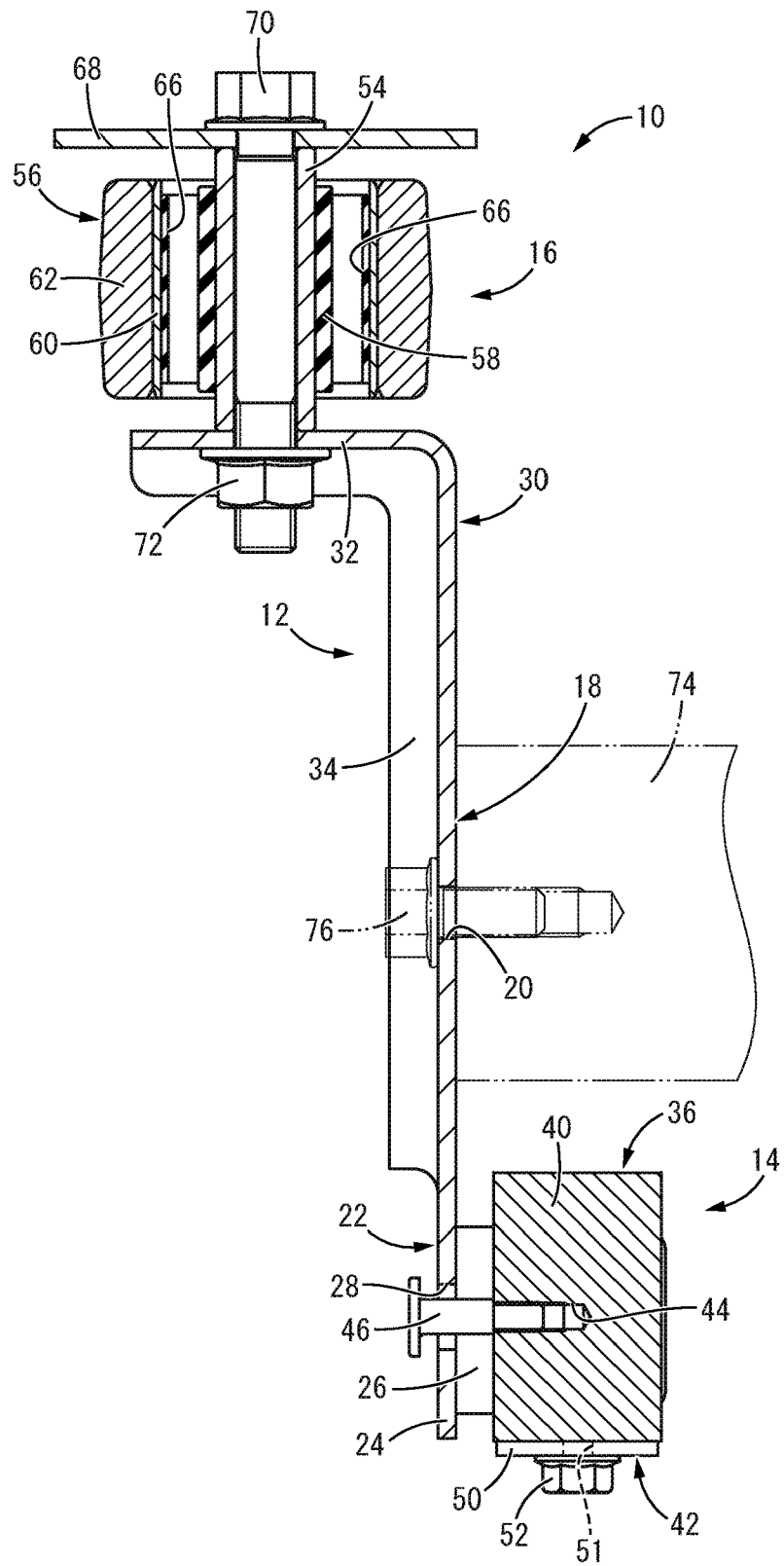
FIG. 6 is a cross sectional view taken along line 6-6 of FIG. 2.

The vibration damper 10 constructed in the above manner is attached to the vehicle body 74 serving as a target member whose vibration is to be damped, as shown in FIG. 6. That is, an attaching bolt 76 inserted into the bolt hole 20 of the metal bracket 12 is screwed to the vehicle body 74, whereby the vibration damper 10 is attached to the vehicle body 74 at the attachment 18 of the metal bracket 12. Since the vibration damper 10 has a structure in which the first dynamic damper 14 and the second dynamic damper 16 are attached to the metal bracket 12, by attaching the metal bracket 12 to the vehicle body 74, it is possible to attach the first dynamic damper 14 and the second dynamic damper 16 to the vehicle body 74 at one time.

When target vibration to be damped is input from the vehicle body 74 to the vibration damper 10, vibration damping action will be exhibited by at least one of the first dynamic damper 14 and the second dynamic damper 16 according to the frequency of the input vibration. The resonance frequency (tuning frequency) of the mass-spring system of the first dynamic damper 14 and the resonance frequency (tuning frequency) of the mass-spring system of the second dynamic damper 16 may be the same as each other. However, for example, by tuning them to mutually different frequencies, excellent damping effects will be exhibited for two types of vibrations with different frequencies. In the present practical embodiment, the resonance frequency of the mass-spring system of the second dynamic damper 16 is tuned to a higher frequency than the resonance frequency of the mass-spring system of the first dynamic damper 14.

With respect to the metal bracket 12 to which the first dynamic damper 14 and the second dynamic damper 16 are attached, the rising walls 26, 26 are provided to the first extended part 22, and the rising supporter 32 is provided to the second extended part 30, and further, the edge flanges 34 are provided to the both widthwise edges thereof continuously from the proximal end portion of the first extended part 22 to the second extended part 30 across its entire length. With this configuration, the metal bracket 12 is reinforced to ensure high deformation rigidity, and the natural frequency of the metal bracket 12 can be easily set to a sufficiently higher frequency than the frequency of the target vibration to be damped, thereby preventing resonance of the metal bracket 12 at the time of input of the target vibration.

In the present practical embodiment, the second extended part 30 is particularly enhanced in rigidity by the provision of the edge flanges 34 across the entire length including the rising supporter 32. By so doing, even if the second dynamic damper 16 tuned to a higher frequency is attached to the second extended part 30, the resonance of the metal bracket 12 will not occur in the tuning frequency range of the second dynamic damper 16.

Besides, in the present practical embodiment, the first dynamic damper 14 has a structure in which the mass member 36 and the pair of rising walls 26, 26 are elastically connected by the pair of support rubber elastic bodies 38, 38, while the second dynamic damper 16 has a bushing structure in which the inner shaft member 54 and the tubular outer mass member 56 are elastically connected by the main rubber elastic body 58. In this way, by adopting the first dynamic damper 14 and the second dynamic damper 16 having mutually different structures, it becomes easy to separately set effective vibration damping performances for various types of vibrations having different frequencies, input directions, and the like. Also, it becomes easy to cope with the case in which there is a limitation in a space for disposing the vibration damper 10.

Additionally, in the metal bracket 12, the direction of rising of the rising supporter 32 and the direction of rising of the rising walls 26, 26 are opposite to each other in the thickness direction of the metal bracket 12. Thus, when attaching the second dynamic damper 16 to the metal bracket 12 later in a state in which the first dynamic damper 14 is mounted by the support rubber elastic bodies 38, 38 being bonded by vulcanization to the rising walls 26, 26, the fastening operation of the connecting bolt 70 and the nut 72 can be easily performed without being hampered by the first dynamic damper 14.

Moreover, the first dynamic damper 14 and the second dynamic damper 16 have a plane symmetry structure with respect to the widthwise center thereof, and are arranged such that their widthwise centers are coincident in the width direction. Therefore, during vibration input in the vertical direction, an input such as torsion is less likely to act on the metal bracket 12, and substantial deformation rigidity of the metal bracket 12 may be improved, thereby making it easy to set the natural frequency of the metal bracket 12 to a high frequency.

Furthermore, the support rubber elastic bodies 38, 38 of the first dynamic damper 14 are bonded by vulcanization to the respective rising walls 26, 26. Thus, the first dynamic damper 14 is formed in the mounted state onto the metal bracket 12 without requiring any special mounting operation.

On the other hand, the inner shaft member 54 of the second dynamic damper 16 is attached later to the rising supporter 32 by the connecting bolt 70 and the nut 72. Accordingly, for example, by preparing various types of second dynamic dampers 16 in advance and selectively mounting an appropriate second dynamic damper 16 according to the required performance or the like, it is possible to realize vibration dampers with different performances while using the metal bracket 12 and the first dynamic damper 14 in common. Moreover, it is easy to, for example, remove the second dynamic damper 16 from the metal bracket 12 and replace it appropriately.

Besides, in the present practical embodiment, the second dynamic damper 16 is attached to the rising supporter 32 so as to be located on the outer side in the lengthwise direction. With this arrangement, no metal bracket 12 exists on either the upper or lower side of the second dynamic damper 16, and the attachment position of the second dynamic damper 16 to the rising supporter 32, the outside diameter dimension of the second dynamic damper 16 in the vertical direction, and the like are not limited by the metal bracket 12. Therefore, it is also possible to reduce the dimension of rising of the rising supporter 32 in the vertical dimension so as to downsize the vibration damper 10 in the vertical direction, and to enlarge the outside diameter dimension of the mass member 36 so as to largely obtain a mass of the mass member, and the like.

In addition, in the metal bracket 12, the width dimension of the wide part 24 of the first extended part 22 is larger than the width dimension of the second extended part 30. With this configuration, it is possible to obtain a large distance between the opposed rising walls 26, 26, so as to obtain a large degree of freedom of the characteristics of the first dynamic damper 14 (the degree of freedom in tuning, durability, etc.).

Moreover, in the metal bracket 12, the width dimension of the second extended part 30 is smaller than the width dimension of the wide part 24 of the first extended part 22. With this configuration, on the side of attachment of the second dynamic damper 16, which has a tubular shape and a small width dimension, it is possible to obtain a sufficient rigidity of the metal bracket 12 owing to the edge flanges 34, 34 and the rising supporter 32, while downsizing the metal bracket 12 in the width direction.

Besides, the first dynamic damper 14 and the second dynamic damper 16 are respectively attached to the first extended part 22 and the second extended part 30, which extend to the mutually opposite sides with respect to the attachment 18 configured to be fastened to the vehicle body 74. With this arrangement, the load exerted on the metal bracket 12 by displacement of the mass members 36, 56 will disperse to and act on both sides in the lengthwise direction of the metal bracket 12. Thus, in comparison with a structure in which a mass member having a large mass is provided at one location, it is easy to obtain a sufficient strength of the metal bracket 12.

Furthermore, in the case in which the tuning frequency of the first dynamic damper 14 and the tuning frequency of the second dynamic damper 16 are the same as or close to each other, the force acting on the attachment 18 (the portion fastened to the vehicle body 74) due to the displacement of the mass member 36 of the first dynamic damper 14 and the displacement of the outer mass member 56 of the second dynamic damper 16 will be reduced. That is, when target vibration to be damped in the vertical direction is input from the vehicle body 74 to the attachment 18 of the metal bracket 12, the mass member 36 of the first dynamic damper 14 and the outer mass member 56 of the second dynamic damper 16, which are provided on both sides of the attachment 18, will displace in the roughly same phase as each other and are less likely to displace in the opposite phase. Therefore, in the structure in which the mass members 36, 56 are disposed on the mutually opposite sides with respect to the attachment 18, in comparison with the case in which the mass members 36, 56 displace in the opposite phase and a large load is input, the moment acting on the vicinity of the bolt hole 20 of the attachment 18 is suppressed, and the strength of the metal bracket 12 or the fixing strength of the attachment 18 will be readily ensured.

In the present practical embodiment, whereas the first dynamic damper 14 and the second dynamic damper 16 are tuned to mutually different frequencies, the first and second dynamic dampers 14, 16 are tuned to the frequencies that are close to each other. As a specific example, the differential between the tuning frequencies of the first dynamic damper 14 and the second dynamic damper 16 is 20 Hz or less. Also, for example, the tuning frequency of the second dynamic damper 16 is 1.3 times or less the tuning frequency of the first dynamic damper 14.

Additionally, the differential between the lengthwise distance from the attachment position of the first dynamic damper 14 with respect to the metal bracket 12 to the bolt hole 20 of the attachment 18 and the lengthwise distance from the attachment position of the second dynamic damper 16 with respect to the metal bracket 12 to the bolt hole 20 of the attachment 18 is small, so that the position of the bolt hole 20 is roughly at the lengthwise center. Therefore, during displacement of the mass members 36, 56 due to the input of the target vibration, it is possible to prevent the situation in which only the force caused by the displacement of either one of the mass members 36, 56 acts largely on the attaching bolt 76 inserted into the bolt hole 20. It is desirable that the lengthwise distance from the attachment position of the first dynamic damper 14 with respect to the metal bracket 12 to the bolt hole 20 of the attachment 18 be 0.5 to 2 times the lengthwise distance from the attachment position of the second dynamic damper 16 with respect to the metal bracket 12 to the bolt hole 20 of the attachment 18.

A practical embodiment of the present invention has been described in detail above, but the present invention is not limited to those specific descriptions. For example, the rising walls 26, 26 supporting the first dynamic damper 14 and the rising supporter 32 supporting the second dynamic damper 16 may protrude so as to rise to the same side as each other.

Besides, the mass brackets 42 need not be provided to the first dynamic damper 14, but the pair of support rubber elastic bodies 38 may be directly fixed to the mass main body 40. Further, in the second dynamic damper 16, the outer mass member 56 is not necessarily limited to the structure in which the intermediate sleeve 60 and the mass main body 62 are combined, but the outer mass member 56 may be integrally formed in its entirety.

Furthermore, the attachment structures of the first dynamic damper 14 and the second dynamic damper 16 to the metal bracket 12 are merely exemplary, and are not limited in any particular way. As a specific example, it would also be acceptable that an attachment fitting is bonded by vulcanization to the widthwise outer side of the support rubber elastic bodies 38, 38, and the attachment fitting is fastened by bolting to the rising walls 26, 26 of the metal bracket 12.

Moreover, the second dynamic damper 16 may be disposed on the inner side of the rising supporter 32 in the lengthwise direction (the lower side in FIG. 2, which is one side), and in that case, for example, the inner shaft member 54 is fastened by bolting to the rising supporter 32 with the end face on the other axial side of the inner shaft member 54 overlapped with the face on the one side of the rising supporter 32. This may downsize the vibration damper 10 in the lengthwise direction. Additionally, by arranging an attachment member between the second dynamic damper 16 and the rising supporter 32, the axial direction of the second dynamic damper 16 can be inclined with respect to the lengthwise direction of the metal bracket 12.

What is claimed is:

1. A vibration damper for reducing vibration of a target member whose vibration is to be damped, comprising:
    a metal bracket including an attachment and being configured to be attached to the target member at the attachment, the metal bracket having a plate shape that extends from the attachment toward mutually opposite sides, the attachment being provided with edge flanges that rise from both widthwise edges across an entire length of the attachment;
    a first extended part serving as one extended side of the metal bracket, the first extended part being provided with the edge flanges that extend continuously from the attachment on both widthwise edges of a proximal end portion of the first extended part and a pair of rising walls that rise on both widthwise sides of the first extended part;
    a first dynamic damper provided between the rising walls, the first dynamic damper including a pair of support rubber elastic bodies fixed to the rising walls and a mass member elastically supported by the support rubber elastic bodies;

a second extended part serving as another extended side of the metal bracket, the second extended part being provided with a rising supporter that rises in an L shape from an end of the second extended part and the edge flanges that are continuous with the attachment on both widthwise edges of the second extended part and extend across an entire length of the second extended part including the rising supporter; and a second dynamic damper attached to the rising supporter, the second dynamic damper including an inner shaft member and a tubular outer mass member that are elastically connected by a main rubber elastic body.

2. The vibration damper according to claim 1, wherein a resonance frequency of the second dynamic damper is tuned to a higher frequency than a resonance frequency of the first dynamic damper.

3. The vibration damper according to claim 1, wherein in the metal bracket, a direction of rising of the rising supporter and a direction of rising of the rising walls are opposite to each other.

4. The vibration damper according to claim 1, wherein the first dynamic damper has a symmetrical shape with respect to a widthwise center of the first dynamic damper, while the second dynamic damper has a symmetrical shape with respect to a widthwise center of the second dynamic damper, and the widthwise center of the first dynamic damper and the widthwise center of the second dynamic damper are coincident with each other.

5. The vibration damper according to claim 1, wherein the support rubber elastic bodies of the first dynamic damper are bonded by vulcanization to the respective rising walls, while the inner shaft member of the second dynamic damper is fastened by bolting to the rising supporter.

6. The vibration damper according to claim 1, wherein in the metal bracket, the first extended part is provided with a wide part having a width dimension larger than that of the second extended part, and the rising walls rise on both widthwise sides of the wide part.

* * * * *